(12) United States Patent
Kong et al.

(10) Patent No.: US 11,015,496 B2
(45) Date of Patent: May 25, 2021

(54) SMALL INTERNAL COMBUSTION ENGINE AND GARDEN TOOL WITH THE SAME

(71) Applicant: Suzhou Cleva Precision Machinery & Technology Co., Ltd., Suzhou (CN)

(72) Inventors: Zhao Kong, Suzhou (CN); Yu Feng, Suzhou (CN); Ning Guo, Suzhou (CN)

(73) Assignee: Suzhou Cleva Precision Machinery and Technology Co., Ltd., Suzhou (CN)

( * ) Notice: Subject to any disclaimer, the term of this patent is extended or adjusted under 35 U.S.C. 154(b) by 0 days.

(21) Appl. No.: 16/488,708

(22) PCT Filed: Feb. 9, 2018

(86) PCT No.: PCT/CN2018/075911
§ 371 (c)(1),
(2) Date: Aug. 26, 2019

(87) PCT Pub. No.: WO2018/153280
PCT Pub. Date: Aug. 30, 2018

(65) Prior Publication Data
US 2020/0248594 A1    Aug. 6, 2020

(30) Foreign Application Priority Data
Feb. 27, 2017  (CN) .................. 201710108326.X

(51) Int. Cl.
*F01M 11/04* (2006.01)
*A01D 34/416* (2006.01)

(52) U.S. Cl.
CPC ....... *F01M 11/0458* (2013.01); *A01D 34/416* (2013.01)

(58) Field of Classification Search
CPC .................. F01M 11/0458; A01D 34/416
See application file for complete search history.

(56) References Cited

U.S. PATENT DOCUMENTS

| 3,990,489 A | 11/1976 | Ruter |
| 6,363,905 B1 * | 4/2002 | Davis .................. F01M 11/04 123/196 R |

(Continued)

FOREIGN PATENT DOCUMENTS

| CN | 202788976 U | 3/2013 |
| CN | 103104308 A | 5/2013 |

(Continued)

OTHER PUBLICATIONS

International Search Report, for International Application No. PCT/CN2018/075911, dated May 10, 2018.

*Primary Examiner* — Kevin A Lathers
(74) *Attorney, Agent, or Firm* — JK Intellectual Property Law, PA

(57) ABSTRACT

A small internal combustion engine includes a housing and an internal combustion engine body arranged in the housing. The internal combustion engine body includes a cylinder, a crankcase, a piston arranged in the cylinder, a crankshaft arranged in the crankcase and driving the piston, and an oil pan arranged at a bottom of the crankcase. The oil pan has an oil pan inlet, and the housing has a housing oil inlet. A hose connected to the oil pan inlet and the housing oil inlet forms a fluid passage for lubricating oil to flow from the housing oil inlet to the oil pan. A related garden tool includes a power source assembly that drives a working assembly to operate via a power transmission assembly.

20 Claims, 8 Drawing Sheets

(56) References Cited

U.S. PATENT DOCUMENTS

2013/0032434 A1\*  2/2013  Esposito ............ F01M 11/0408
                                                    184/1.5
2018/0331471 A1\* 11/2018  Zhang .................... F16L 33/30

FOREIGN PATENT DOCUMENTS

| CN | 201572680 U | 4/2016 |
| CN | 106321190 A | 1/2017 |
| CN | 206539393 U | 10/2017 |
| JP | 2010242395 A | 10/2010 |

\* cited by examiner

SMALL INTERNAL COMBUSTION ENGINE AND GARDEN TOOL WITH THE SAME

CROSS-REFERENCE TO RELATED PATENT APPLICATIONS

This application is a national stage of International Application No. PCT/CN2018/075911, filed on Feb. 9, 2018 which claims priority to CN Patent Application No. 201710108326.X, filed on Feb. 27, 2017. All of the aforementioned applications are hereby incorporated by reference in their entireties.

TECHNICAL FIELD

The disclosure relates to a small internal combustion engine and also relates to a garden tool with the small internal combustion engine.

BACKGROUND

Garden tools generally use small internal combustion engines as power sources thereof, such as grass trimmers, lawnmowers, brush cutters, pruners, chain saws, etc., having small gasoline engines. At present, the lubricating oil filling pipelines of small internal combustion engines applied to garden tools are generally set to be hard pipes, and the design positions of the housing oil inlets on the housings of the internal combustion engines are confined near the oil pans, so that the difficulties of structural layouts of the internal combustion engines are increased. Among them, especially for small internal combustion engines, the difficulties of structural layouts are seriously influenced by the situation that the positions of the oil inlets of the housings are limited due to the small internal spaces of the small internal combustion engines, and the difficulties of manufacturing molds are also increased. In addition, oil filling pipes are generally set to be hard pipes and be connected with the oil pans through the forms of screw fastening. It is found in the drop test that it is prone to loose, crack, or even break, which influence the structural stability of internal combustion engine products. Especially for the small internal combustion engines applied to the garden tools, due to the complicated working environment, they will inevitably fall, collide or strongly vibrate, thereby seriously affecting the stability and the service life of the garden tools.

SUMMARY

The object of the disclosure is to provide a small internal combustion engine and a garden tool with the same, which solves at least one of the problems of difficult structural layout, difficult mold manufacturing, poor structural stability and the like.

To achieve one of the above objects, Embodiment 1 of the present disclosure provides a small internal combustion engine including a housing and an internal combustion engine body arranged in the housing, wherein the internal combustion engine body comprises a cylinder, a crankcase, a piston arranged in the cylinder, a crankshaft arranged in the crankcase and driving the piston, and an oil pan arranged at the bottom of the crankcase, the oil pan having an oil pan inlet, and the housing having a housing oil inlet, wherein the internal combustion engine body further includes a hose, which is connected with the oil pan inlet and the housing oil inlet to constitute a fluid passage for lubricating oil to flow from the housing oil inlet to the oil pan.

As a further improvement of Embodiment 1 of the present disclosure, the oil pan includes an oil pan body having the oil pan inlet, a storage chamber for storing lubricating oil, and a second connecting portion extending from the oil pan inlet out of the oil pan body, the second connecting portion having a third passage communicating with the storage chamber; the housing oil inlet is provided with a joint assembly, and the joint assembly is provided with a first passage communicated with the outside through an oil filling port; the hose has a second passage; the first passage, the second passage and the third passage are communicated to form a fluid passage for lubricating oil to flow from the oil filling port to the storage chamber.

As a further improvement of Embodiment 1 of the disclosure, the hose is made of a transparent material resistant to oil and high temperature.

As a further improvement of Embodiment 1 of the present disclosure, the hose is made of fluorosilicone rubber.

As a further improvement of Embodiment 1 of the disclosure, the hose includes a first end and a second end arranged opposite each other, the joint assembly includes a first connecting portion that can be socketed to or disengaged with the first end, and the second connecting portion can be socketed to or disengaged with the second end.

As a further improvement of Embodiment 1 of the disclosure, the engine body further comprises a fastening band provided on at least one of the first end and the second end, the fastening band being pressable against the hose, so that the inner sidewall of the hose tends to be tightened inwardly.

As a further improvement of Embodiment 1 of the present disclosure, the internal combustion engine body further includes an annular tooth provided on at least one of the outer sidewall of the first connecting portion and the outer sidewall of the second connecting portion.

As a further refinement of Embodiment 1 of the present disclosure, the joint assembly includes, a housing connector having a positioning mechanism;

an joint which can be mated and assembled on the housing connector, the joint being provided with a positioned mechanism matched with the positioning mechanism;

wherein the positioning mechanism and the positioned mechanism are configured such that movement displacement of the joint with respect to the housing connector is restricted when the positioned mechanism is mated to the positioning mechanism.

As a further improvement of Embodiment 1 of the present disclosure, the small internal combustion engine further comprises a starter motor that drives the crankshaft via a speed reduction mechanism.

To achieve one of the above objects, an embodiment of the present disclosure further provides a garden tool, including a working assembly, a power transmission assembly and a power source assembly, and the power source assembly driving the working component to operate by the power transmission assembly, wherein the power source assembly comprises the small internal combustion engine described above.

Embodiments of the present disclosure have the beneficial effects that: the housing oil inlet and the oil pan inlet are connected through a hose, and the hose can be arranged in the assembly space of the small internal combustion engine according to requirements, therefore the arrangement of the housing oil inlet and the oil pan is not limited to be close to each other, and thereby reducing the difficulty of structural layout; meanwhile, each component (especially the oil pan) has a simple structure, the manufacturing difficulty is reduced, and there is no need to design a complex mold, so that the manufacturing difficulty and the manufacturing cost are reduced; moreover, based on the flexibility of the hose, the anti-collision capability of the internal combustion engine is stronger, and the probability of product damage is reduced.

DETAILED DESCRIPTION OF THE DISCLOSURE

The invention will be described in detail below with reference to specific embodiments shown in the accompanying drawings. However, these embodiments are not intended to limit the present invention, and structural, methodological, or functional changes made by those skilled in the art based on these embodiments are intended to be included within the scope of the present invention.

Figure 1:
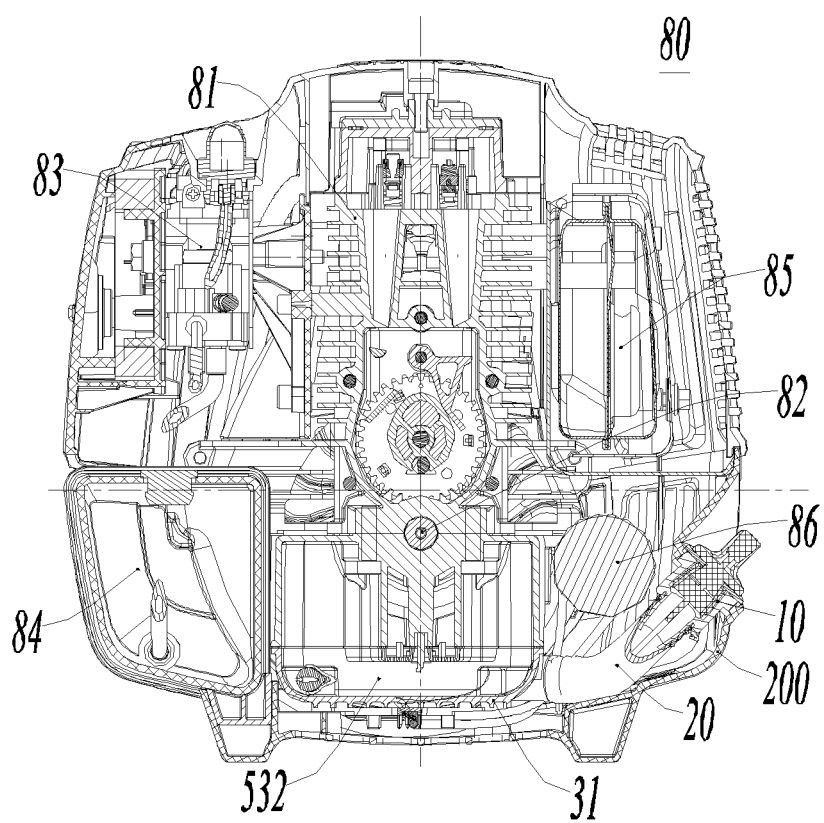
FIG. 1 is a cross-sectional view of a gasoline engine according to Embodiment 1 of the present disclosure.
Figure 2:
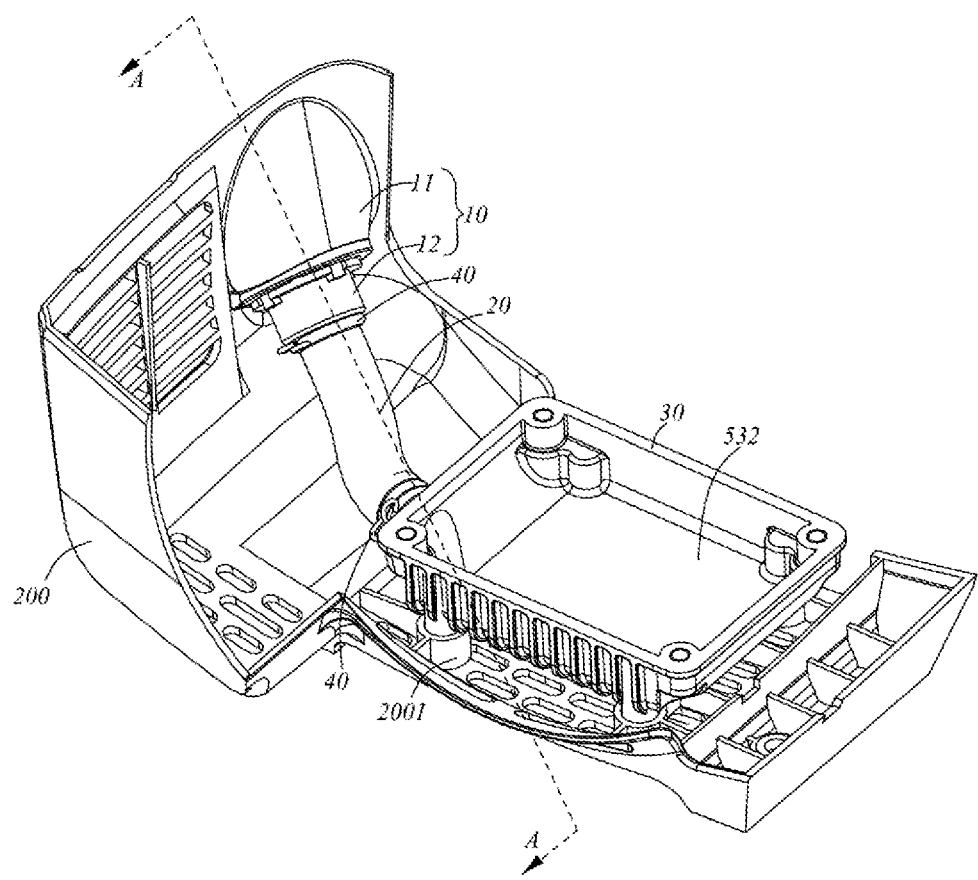
FIG. 2 is a schematic view of the assembly of a gasoline engine housing (partial) and an internal combustion engine body according to Embodiment 1 of the present disclosure.

As shown in FIG. 1 and FIG. 2, Embodiments 1 of the present disclosure discloses a small internal combustion engine, and more particularly, a small gasoline engine 80 including a housing 200, an internal combustion engine body arranged in the housing 200, wherein the internal combustion engine body includes a cylinder 81, a crankcase arranged below the cylinder 81, a piston arranged in the cylinder 81 and reciprocating, a crankshaft 82 arranged in the crankcase and driving the piston, and an oil pan 30 arranged below the crankcase and storing lubricating oil, the oil pan 30 having an oil pan inlet, and the housing 200 having a housing oil inlet; the internal combustion engine body further includes a hose 20 connecting the oil pan inlet and the housing oil inlet to form a fluid passage for lubricating oil flowing from the housing oil inlet to the oil pan 30.

In the present embodiment, in accordance with the orientation in FIG. 1, the cylinder 81, the crankshaft 82, the crankcase, and the oil pan 30 are orderly arranged in the middle of the space in the housing 200 from the top to the bottom. A fuel supply system is arranged on the left side of the space in the housing 200, specifically, a fuel tank 84 is arranged below the left side, and a carburetor 83, a filter device, and the like are arranged above the fuel tank 84. A muffler 85 and a starter motor 86 are arranged on the right side of the space in the housing 200, specifically, the starter motor 86 is arranged on the lower right side, and the muffler 85 is arranged above the starter motor 86. The housing oil inlet is provided on the housing 200 on the right side of the starter motor 86, and correspondingly, the oil pan inlet is provided on the oil pan 30 and is located on the lower left side of the starter motor 86.

Due to the small size of the small gasoline engine, the space in the housing is limited; in order to more conveniently arrange each component in the gasoline engine, a hose is selected to connect the oil pan inlet with the housing oil inlet, so the flexibility of arranging each component in the gasoline engine can be increased; housing oil inlet is not required to be arranged at a position close to the oil pan inlet, and only a space for accommodating the flexible hose is reserved between the housing oil inlet and the oil pan inlet, so that the available space in the housing can be obviously increased, and convenience is provided for further optimizing the structure of the small gasoline engine.

In the present embodiment, when the gasoline engine 80 is started, the starter motor 86 drives the crankshaft 82 to rotate through a speed reduction mechanism, thereby realizing starting.

Figure 3:
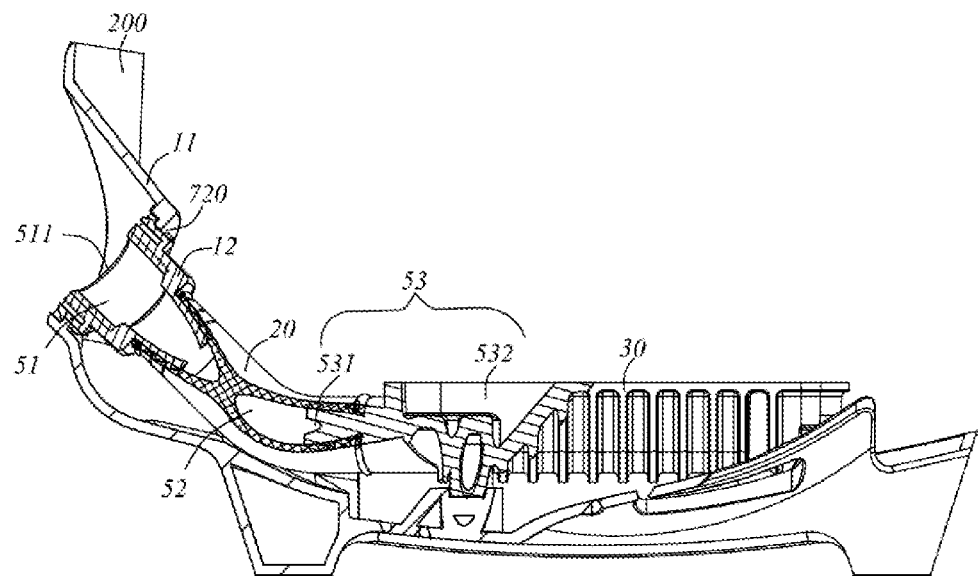
FIG. 3 is a sectional view taken along line A-A of FIG. 1.
Figure 4:
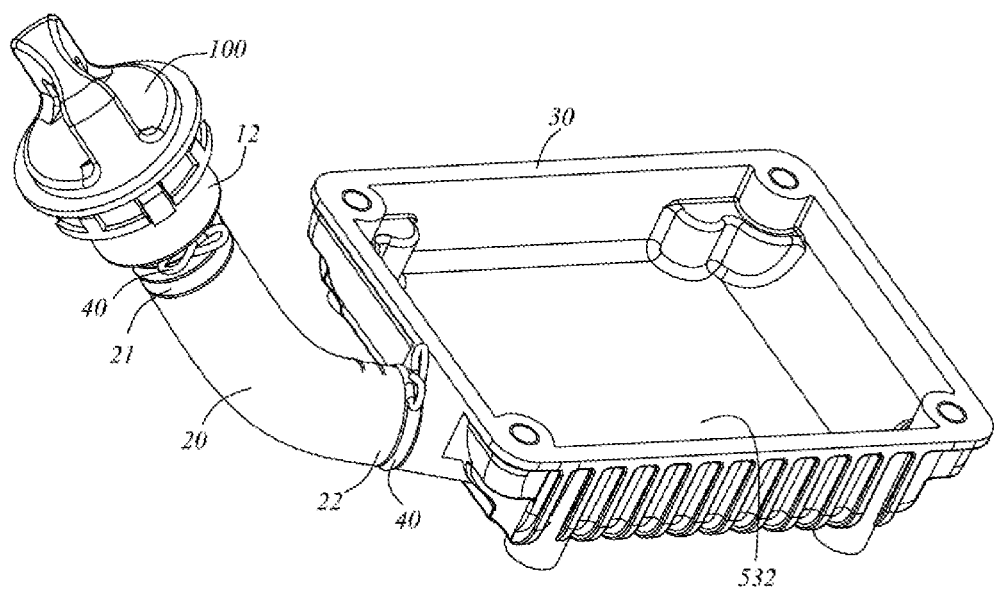
FIG. 4 is a partial schematic structural view of the internal combustion engine body according to Embodiment 1 of the present disclosure.
Figure 5:
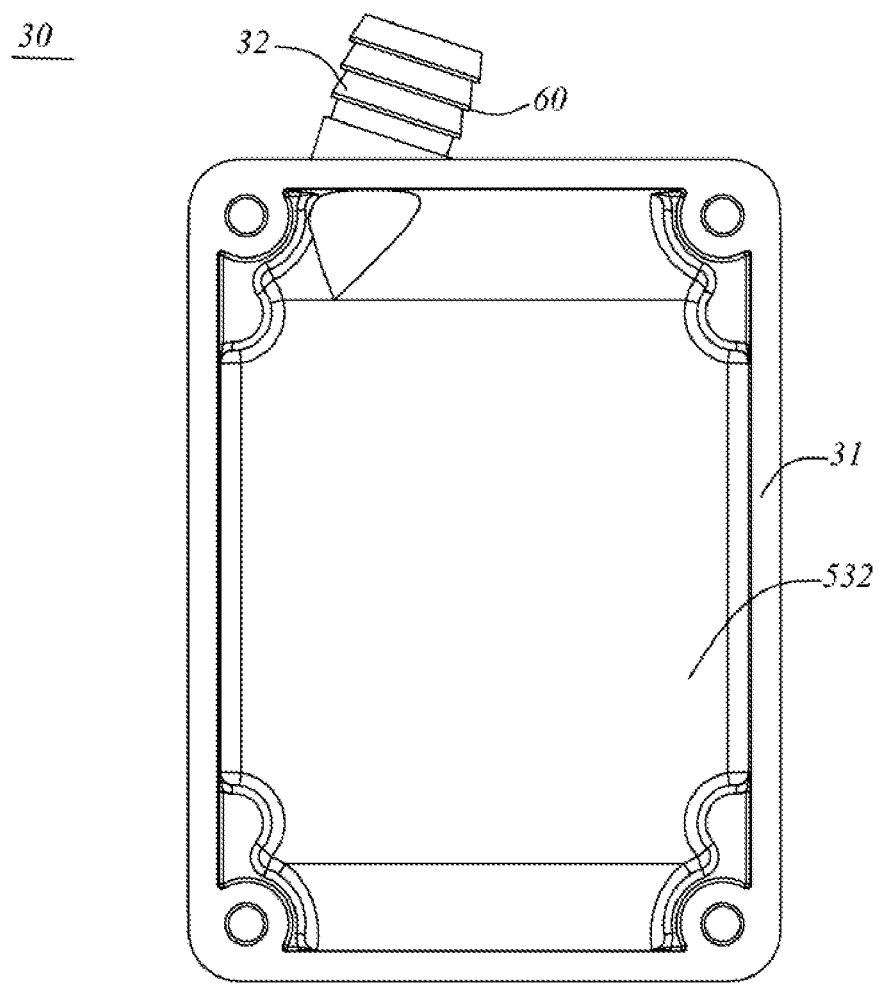
FIG. 5 is a schematic structural view of an oil pan according to Embodiment 1 of the present disclosure.
Figure 6:
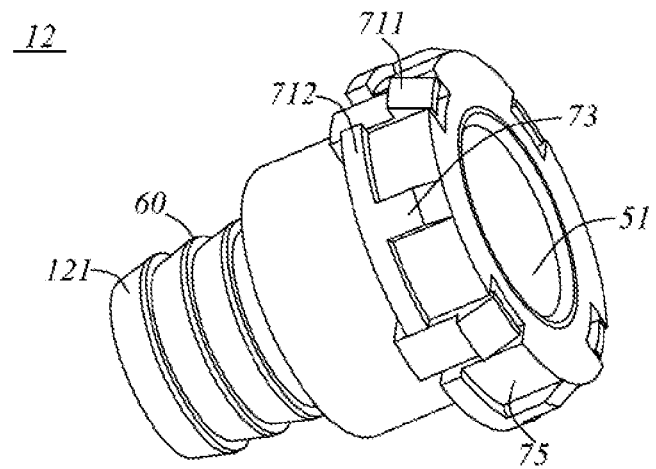
FIG. 6 is a schematic structural view of a joint, at an angle, according to Embodiment 1 of the present disclosure.

Referring to FIG. 2 and FIG. 3, the internal combustion engine body further includes a joint assembly 10. The joint assembly 10 is connected to the housing oil inlet and is provided with a first passage 51, wherein an opening end of the first passage 51 is set to be an oil filling port 511, and the first passage 51 can be communicated with the outside through the oil filling port 511, wherein the oil filling port 511 is formed at the housing oil inlet in Embodiment 1; the oil pan 30 is provided with an oil pan body 31 having the oil pan inlet, a storage chamber 532 for storing lubricating oil, and a second connecting portion 32 extending from the oil pan inlet out of the oil pan body 31, the second connecting portion 32 having a third passage 53 communicating with the storage chamber 532; the hose 20 is connected with the joint assembly 10 and the oil pan 30, which is provided with a second passage 52; wherein the first passage 51, the second passage 52, and the third passage 53 are communicated with each other to form a fluid passage through which the lubricating oil flows from the oil filling port 511 to the storage chamber 532. Thus, the joint assembly 10 and the oil pan 30 are communicated by the hose 20, and the hose 20 can be arranged in the assembling space of the housing 200 as required, so that the arrangement of the housing oil inlet and the oil pan 30 is not limited to be close to each other, thereby reducing the difficulty of structural layout; meanwhile, each component (especially the oil pan 30) of the internal combustion engine body has a simple structure, a reduced processing difficulty, and does not need to design a complex mold, so that the manufacturing difficulty and the manufacturing cost are reduced; in addition, due to the flexibility of the hose 20, the internal combustion engine has a greater crashworthiness, reducing the chance of product damage.

In the present embodiment, the hose 20 is specifically configured to resist oil and high temperature, thereby enhancing the service life of the hose 20 while also avoiding the restriction of the structural design of the third passage 53 due to the hose 20. Preferably, the material of the hose 20 may be nylon, PU, or the like. In the present embodiment, the hose 20 is further made of a transparent material so that the height of the lubricating oil level can be conveniently observed. Furthermore, the hose 20 is made of fluorosilicone rubber materials, which can simultaneously achieve softness, transparency, and oil and high temperature resistance.

To clearly express the position and direction described in the present application, hereinafter, along the extending direction of the fluid passage, the direction from the oil filling port 511 to the storage chamber 532 is defined as rear, and conversely, the direction from the storage chamber 532 to the oil filling port 511 is defined as front; the plane perpendicular to the extending direction is defined as the cross section; in the cross section, the direction relatively far from the fluid passage is defined as the outer side, whereas the direction relatively close to the fluid passage is defined as the inner side.

Referring to FIGS. 2 to 6, in the present embodiment, the joint assembly 10 includes a first connecting portion 121, and the open end of the first passage 51 is arranged at the first connecting portion 121; the oil pan body 31 encloses the storage chamber 532, an open end of the third passage 53 is arranged at the second connecting portion 32, and the other open end is arranged at the oil pan inlet; the hose 20 includes a first end 21 and a second end 22 arranged opposite to each other, and an open end of the second passage 52 is arranged at the first end 21 and the other open end is arranged at the second end 22. Wherein, the first end 21 and the first connecting portion 121 can be coupled to each other to achieve the communication between the first passage 51 and the second passage 52; the first end 22 and the second connecting portion 32 may be coupled to each other to achieve the communication between the second passage 52 and the third passage 53.

Further, the first end 21 and the first connecting portion 121 can be socketed or disengaged, and when the two are socketed, the joint assembly 10 and the hose 20 are connected, and when the two are disengaged, the joint assembly 10 and the hose 20 are separated; similarly, the second end 22 and the second connecting portion 32 can be socketed or disengaged, and when the two are socketed, the oil pan 30 and the hose 20 are connected, and when the two are disengaged, the oil pan 30 and the hose 20 are separated. Thus, the assembly is realized through a socket mode, and the assembly process is convenient and quick.

Specifically, the socket joint of the first end 21 and the first connecting portion 121 has a plurality of implementation manners: in one implementation manner, the first end 21 is socketed outside the first connecting portion 121; in another implementation manner, the first connecting portion 121 is socketed outside the first end 21; in another implementation manner, the first end 21 is a double-layer pipe with an interval, and the first connecting portion 121 is socketed between the inner-layer pipe and the outer-layer pipe of the double-layer pipe; of course, variations of the above and other implementations based on sockets may be made without departing from the spirit of the disclosure.

Similarly, the socket connection between the second end 22 and the second connecting portion 32 can also be realized in various manners, and reference can be made to the socket connection between the first end 21 and the first connecting portion 121, which is not repeated here.

In the present embodiment, the first end 21 is socketed outside the first connecting portion 121, and the second end 22 is socketed outside the second connecting portion 32. In other words, when the hose 20 connects the joint assembly 10 and the oil pan 30, the inner sidewall of the first end 21 is located relatively outside the outer sidewall of the first connecting portion 121, and the inner sidewall of the second end 22 is located relatively outside the outer sidewall of the second connecting portion 32.

Further, the cross-sections of the inner sidewall of the first end 21, the outer sidewall of the first connecting portion 121, the inner sidewall of the second end 22, and the outer sidewall of the second connecting portion 32 are all set to be circular, and accordingly, the maximum value of the diameter of the inner sidewall of the first end 21 defines the maximum inner diameter of the first end 21, the maximum value of the diameter of the outer sidewall of the first connecting portion 121 defines the maximum outer diameter of the first connecting portion 121, the maximum value of the diameter of the inner sidewall of the second end 22 defines the maximum inner diameter of the second end 22, and the maximum value of the diameter of the outer sidewall of the second connecting portion 32 defines the maximum outer diameter of the second connecting portion 32.

Wherein, in the present embodiment, the maximum outer diameter of the first connecting portion 121 is greater than the maximum inner diameter of the first end 21, and when the first end 21 is socketed outside the first connecting portion 121, the first connecting portion 121 will support the first end 21 outward, so that the connection is firmer, and the probability of accidental disengagement is reduced; similarly, the maximum outer diameter of the second connecting portion 32 is greater than the maximum inner diameter of the second end 22, and when the second end 22 is socketed outside the second connecting portion 32, the second connecting portion 32 will support the second end 22 outward, so that the connection is firmer, the probability of accidental disengagement is reduced, and the leakage of the lubricating oil can also be avoided. Of course, in other embodiments, it may be configured that the maximum outer diameter of the first connecting portion 121 is greater than the maximum inner diameter of the first end 21, and the maximum outer diameter of the second connecting portion 32 is not greater than the maximum inner diameter of the second end 22; alternatively, the maximum outer diameter of the first connecting portion 121 is not greater than the maximum inner diameter of the first end 21, and the maximum outer diameter of the second connecting portion 32 is greater than the maximum inner diameter of the second end 22.

Further, the internal combustion engine body further includes annular teeth 60 provided on at least one of the outer sidewall of the first connecting portion 121 and the outer sidewall of the second connecting portion 32. Preferably, as in the present embodiment, the outer sidewall of the first connecting portion 121 and the outer sidewall of the second connecting portion 32 are both provided with the annular teeth 60.

Specifically, the hose 20 further includes a middle portion between the first end 21 and the second end 22; the annular teeth 60 are provided to be inclined in the direction away from the middle portion of the hose 20, that is, the annular teeth 60 provided on the outer sidewall of the first connecting portion 121 are inclined toward the front, and the annular teeth 60 provided on the outer sidewall of the second connecting portion 32 are inclined toward the rear. In this way, on the one hand, the assembly of the hose 20 with the joint assembly 10 and the oil pan 30, respectively, can be facilitated; on the other hand, the frictional resistance when the hose is disengaged with the oil pan and the joint assembly can be increased, so that the risk of accidental disengagement is reduced.

Figure 7:
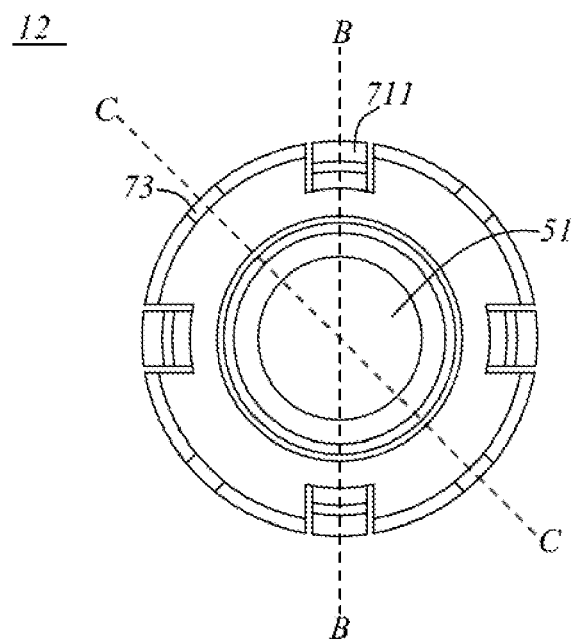
FIG. 7 is a schematic structural view of the joint, at another angle, according to Embodiment 1 of the present disclosure.
Figure 8:
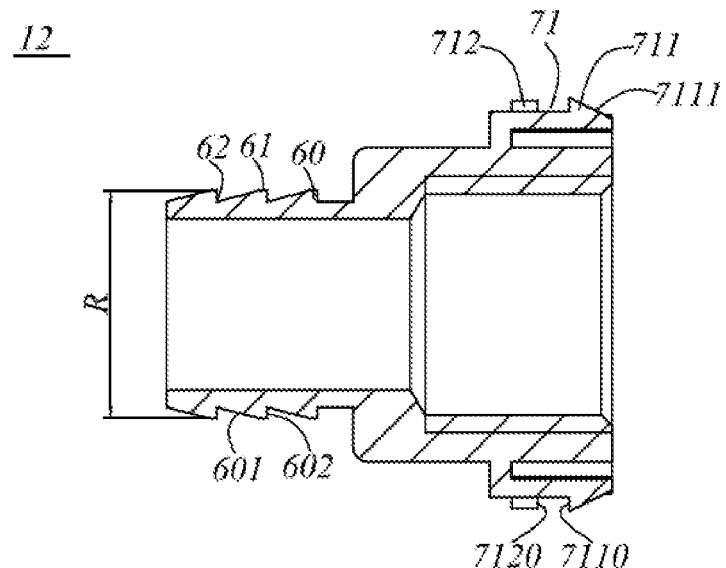
FIG. 8 is a sectional view taken along line B-B in FIG. 7.
Figure 9:
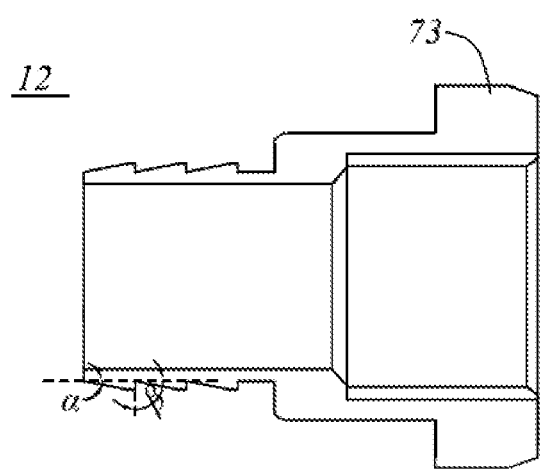
FIG. 9 is a sectional view taken along line C-C in FIG. 7.

Referring to FIGS. 7 to 9, the specific structure of the annular tooth 60 is described by taking the example of the annular tooth 60 arranged on the outer sidewall of the first connecting portion 121. The annular tooth 60 include a tooth peak 61 located relatively far from the fluid passage, and a first wall 601 and a second wall 602 located on both sides of the tooth peak 61, wherein the included angle α of the first wall 601 with respect to the front-rear direction is smaller than the included angle β of the second wall 602 with respect to the front-rear direction; and, the first wall 601 is close to the middle of the hose 20 relative to the second wall 602, that is, the first wall 601 of the annular tooth 60 on the first connecting portion 121 is rearward relative to the second wall 602, and the first wall 601 of the annular tooth 60 on the second connecting portion 32 is frontward relative to the second wall 602.

Further, the diameter R of the outer sidewall of the first connecting portion 121 at the tooth peak 61 defines the maximum outer diameter of the first connecting portion 121, and likewise, the diameter of the outer sidewall of the second connecting portion 32 at the tooth peak 61 defines the maximum outer diameter of the second connecting portion 32.

In addition, the outer sidewall of the first connecting portion 121 and the outer sidewall of the second connecting portion 32 are both provided with a plurality of annular teeth 60 which are continuously distributed, and a tooth valley 62 is formed at the intersection of two adjacent annular teeth 60.

In the present embodiment, preferably, the mating structure of the first connecting portion 121 and the mating structure of the second connecting portion 32 are the same, that is, the structures related to the mating in the first connecting portion 121 and the second connecting portion 32 are the same, and other structures not related to the mating may be the same or different; the mating structure of the first end 21 and the mating structure of the second end 22 are also the same, that is, the structures related to the mating in the first end 21 and the second end 22 are the same, and other structures not related to the mating may be the same or different. Thus, during assembly, either end of the hose 20 can be mated with the first connecting portion 121, and the other end of the hose 20 can be mated with the second connecting portion 32, so that screening and matching are not needed, and rapid assembly is facilitated.

Figure 10:
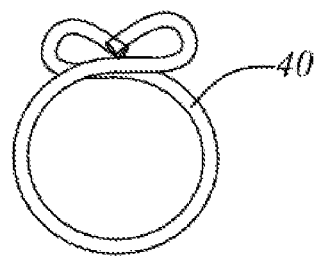
FIG. 10 is a schematic structural view of a fastening band according to Embodiment 1 of the present disclosure.
Figure 11:
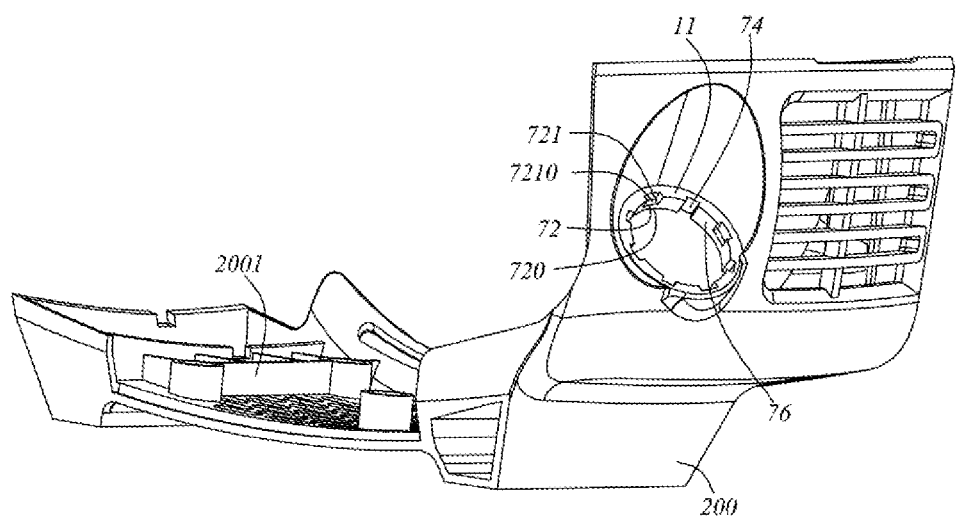
FIG. 11 is a schematic structural view of the gasoline engine housing (partial) and a housing connector according to Embodiment 1 of the present disclosure.

Further, in conjunction with FIGS. 2 to 3 and 10, the internal combustion engine body further includes a fastening band 40 arranged at least one of the first end 21 and the second end 22, and in the present embodiment, the fastening band 40 is arranged at each of the first end 21 and the second end 22 for reinforcing the connection of the hose 20 with the joint assembly 10 and the oil pan 30. Specifically, when the first end 21 is socketed outside the first connecting portion 121, the fastening band 40 wraps around the first end 21 and presses against the first end 21, so that the inner sidewall of the first end 21 tends to be tightened inwardly, and the pressure between the first end 21 and the first connecting portion 121 is increased, thereby increasing the fixing effect between the hose 20 and the joint assembly 10; when the second end 22 is socketed outside the second connecting portion 32, the fastening band 40 wraps around the second end 22 and presses against the second end 22, so that the inner sidewall of the second end 22 tends to be tightened inwardly, and the pressure between the second end 22 and the second connecting portion 32 is increased, thereby increasing the fixing effect between the hose 20 and the oil pan 30.

Meanwhile, by providing the fastening band 40, not only the connection of the hose 20 with the oil pan 30 and the joint assembly 10 is further ensured, but also the quick assembly and disassembly of the hose 20 with the oil pan 30 and the joint assembly 10 can be achieved.

Preferably, the fastening band 40 is clamped at a position of the hose 20 corresponding to the tooth valley 62, and the angle β of the second wall 602 with respect to the front-rear direction is set to be approximately 90°.

Referring to FIGS. 6 to 9 and 11, in the present embodiment, the joint assembly 10 includes a housing connector 11 and a joint 12. Wherein, the housing connector 11 is fixedly connected to the housing 200, and may be integrally formed on the housing 200, and the housing connector 11 includes a fourth connecting portion; the joint 12 includes a first connecting portion 121 at the rear end, and a third connecting portion at the front end; the third and fourth connecting portions may cooperate with each other to achieve the detachable mate between the joint 12 and the housing connector 11. Of course, in other embodiments, the joint 12 may be integrated with the housing connector 11.

In the present embodiment, the joint 12 can be assembled and mated to the housing connector 11 in the extending direction (i.e., the front-rear direction) of the first passage 51.

Further, the fourth connecting portion is provided with a positioning mechanism, and the third connecting portion is provided with a positioned mechanism matched with the positioning mechanism. The positioning mechanism and the positioned mechanism are configured such that when the positioned mechanism is fitted to the positioning mechanism, the movement displacement of the joint 12 relative to the housing connector 11 is restricted to achieve relative fixation of the joint 12 and the housing connector 11.

Specifically, the positioning mechanism includes a clamping portion 72; the positioned mechanism includes a clamped portion 71 that matches with the clamp portion 72, and when the clamped portion 71 is fitted to the clamping portion 72, the movement displacement of the joint 12 relative to the housing connector 11 in the extending direction of the first passage 51 is restricted.

In the present embodiment, the fourth connecting portion is provided with a clamping slot 721 in front of the clamping portion 72, and the clamping portion 72 includes a first mating surface 7210 formed between the clamping portion 72 and the clamping slot 721, and a second mating surface 720 formed behind the clamping portion 72; the third connecting portion is provided with a hook 711 and a flange 712 relatively positioned behind the hook 711, and the clamped portion 71 includes a third mating surface 7110 formed on the hook 711 and a fourth mating surface 7120 formed in front of the flange 712. Wherein, the clamping portion 72 can be accommodated in the clamped portion 71, and at this time, the first mating surface 7210 is attached to and abuts against the third mating surface 7110 to restrict the backward movement of the joint 12 with respect to the housing connector 11; the second mating surface 720 is attached to and abuts against the fourth mating surface 7120 to restrict the forward movement of the joint 12 relative to the housing connector 11.

In addition, when the clamping portion 72 is accommodated in the clamped portion 71, the hook 711 can be just fit into the clamping slot 721. The front portion of the hook 711 is specifically configured to be movable in the inside-outside direction, so that the hook 711 can smoothly pass over the clamping portion 72 and fit into the clamping slot 721 during the assembling process.

Further, the positioning mechanism includes a guiding portion 74; the positioned mechanism includes a guided portion 73 that matches with the guiding portion 74, and when the guided portion 73 is matched with the guiding portion 74, the movement displacement of the joint 12 at least in the circumferential direction relative to the housing connector 11 is restricted, that is, the joint 12 cannot rotate at least relative to the housing connector 11.

In the present embodiment, the guiding portion 74 is provided as a guiding slot extending in the front-rear direction, and the guided portion 73 is provided as a guiding projection. Of course, in other embodiments, the positions of the guiding portion 74 and the guided portion 73 may be interchanged. In addition, the guiding portion 74 and the guided portion 73 can also serve to guide the movement of the joint 12 in the front-rear direction relative to the housing connector 11 to facilitate positioning of the assembly process.

In addition, the guiding portion 74 and the guided portion 73 are also configured such that when the guided portion 73 is matched with the guiding portion 74, the movement displacement of the joint 12 in the inside-outside direction with respect to the housing connector 11 is restricted, that is, the joint 12 cannot be shaken inside and outside with respect to the housing connector 11.

Further, the positioning mechanism includes a limiting surface 76; the positioned mechanism includes a limited surface 75 that matches with the limiting surface 76; when the joint 12 is assembled to the housing connector 11, the limiting surface 76 and the limited surface 75 can be attached to each other, so that the movement displacement of the joint 12 with respect to the housing connector 11 in the inside-outside direction is further limited, and it is ensured that the joint 12 cannot be shaken inside and outside with respect to the housing connector 11.

Further, the clamping portion 72 and the clamped portion 71, the guiding portion 74 and the guided portion 73 may be respectively provided as a plurality of groups which match each other. In the present embodiment, the clamping portion 72 and the clamped portion 71, and the guiding portion 74 and the guided portion 73 are respectively provided in four groups, and are evenly arranged in the circumferential direction.

In addition, in the present embodiment, the housing 200 includes an oil pan fixing portion 2001, and the oil pan 30 is fixedly mounted at the oil pan fixing portion 2001. In other embodiments, the oil pan 30 may be mounted at other locations of the gasoline engine, without interfering with the location of the housing oil inlet.

Figure 12:
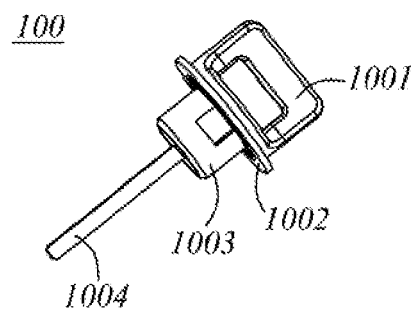
FIG. 12 is a schematic structural view of a dipstick according to Embodiment 1 of the present disclosure.

Referring to FIG. 12, the gasoline engine 80 further includes a dipstick 100 arranged at the oil filling port 511 and at least applied to seal the fluid passage. Specifically, the dipstick 100 includes a handle 1001 for an operator to hold, a seal ring 1002 for sealing the fluid passage, a plug portion 1003 that can extend into and close the oil filling port 511, and a measuring gauge 1004 that penetrates into the fluid passage.

Figure 13:
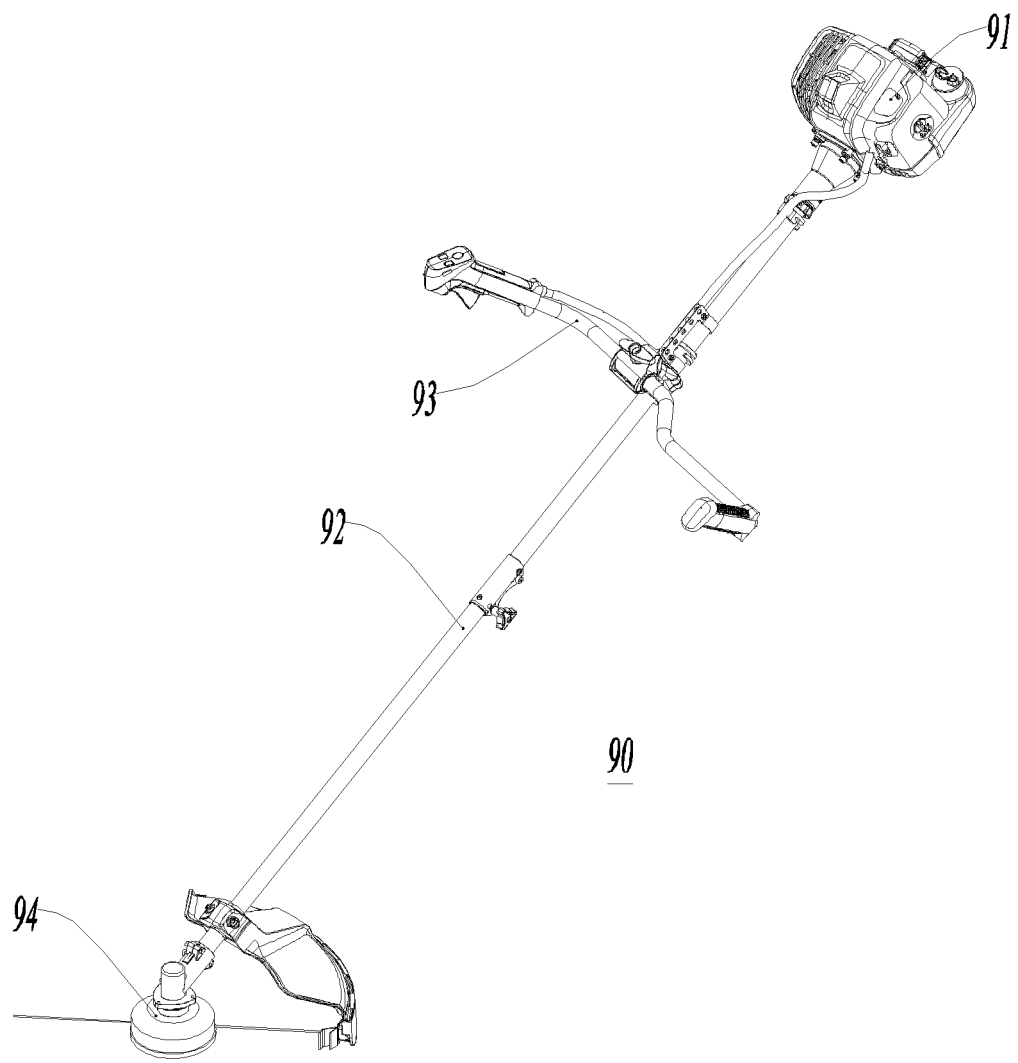
FIG. 13 is a schematic view of a grass trimmer according to another embodiment of the present disclosure.

Referring to FIG. 13, another embodiment of the present disclosure discloses a garden tool, which may be embodied as a grass trimmer, a lawnmowers, a brush cutter, a pruner, a chain saw, etc., in the present embodiment, the garden tool is a grass trimmer 90, which includes a machine head 91, a connecting rod 92, a handle 93, and a grass trimmer head 94. Wherein the machine head 91 is connected to one end of the connecting rod 92, and the grass trimmer head 94 is connected to the other end of the connecting rod 92. The handle 93 is connected to the middle of the connecting rod 92, and the connection position and angle of the handle 93 can be adjusted according to the user's demand. The grass trimmer 90 uses a small internal combustion engine as a power source, and specifically, a small gasoline engine 80 is arranged in the machine head 91. A power transmission assembly is arranged in the connecting rod 92, and the small gasoline engine 80 drives the grass trimmer rope of the grass trimmer head 94 to rotate through the power transmission assembly so as to carry out grass trimming operation.

Compared with the prior art, the small internal combustion engine and the garden tool with the same provided by the embodiment of the disclosure have the beneficial effects that: the housing oil inlet and the oil pan inlet are connected through a hose, and the hose can be arranged in the assembly space of the small internal combustion engine according to requirements, therefore the arrangement of the housing oil inlet and the oil pan is not limited to be close to each other, and thereby reducing the difficulty of structural layout; meanwhile, each component has a simple structure, the manufacturing difficulty is reduced, and there is no need to design a complex mold, so that the manufacturing difficulty and the manufacturing cost are reduced; in addition, the hose can be rapidly assembled with the oil pan and the joint assembly, and through the setting of the annular teeth and the fastening band, the fixing effect can be enhanced, the risk of accidental loosening can be reduced, and the structural stability of products can be enhanced.

It is to be understood that although the specification has been described in terms of embodiments, each embodiment is not to be construed as an independent technical solution, and that such recitation is merely for purposes of clarity. Those skilled in the art should take the specification as a whole, and the technical solutions in the embodiments may be suitably combined to form additional embodiments that may be appreciated by those skilled in the art.

The above detailed description is only specific to the possible embodiments of the present invention, and is not intended to limit the scope of the present invention, and all equivalent embodiments or modifications that do not depart from the spirit of the present invention are intended to be included within the scope of the present invention.

The invention claimed is:

1. A small internal combustion engine comprising:
a housing including a housing connector defining a housing oil inlet therethrough;
a joint attached to the housing connector within the housing oil inlet, the joint defining an oil filling port and a first connecting portion spaced from the oil filling port along a central axis of the joint;
an internal combustion engine body arranged in the housing, the internal combustion engine body including a cylinder, a crankcase, a piston arranged in the cylinder, a crankshaft arranged in the crankcase and driving the piston, and an oil pan arranged at a bottom of the crankcase, the oil pan having an oil pan inlet defining a second connecting portion;
a hose having a first end connected to the joint via the first connecting portion and having a second end connected to the oil pan inlet via the second connecting portion to form a fluid passage for lubricating oil to flow from the housing oil inlet to the oil pan; and
a joint assembly interface securing the joint to the housing connector, the joint assembly interface including guiding slots on one of the joint and the housing connector sized for receiving guiding portions on the other of the joint and the housing connector, the guiding slots and the guiding portions extending in a direction parallel to the central axis of the joint for axially aligning the joint and the housing connector, the joint assembly interface further including a first mating surface and a second mating surface on one of the joint and the housing connector and a third mating surface and a fourth mating surface on the other of the joint and the housing connector, the first, second, third and fourth mating surfaces each extending in a direction substantially perpendicular to the central axis of the joint for axially securing the joint and the housing connector.

2. The small internal combustion engine according to claim 1, wherein the oil pan includes an oil pan body having the oil pan inlet, a storage chamber for storing lubricating oil, the second connecting portion having a third passage communicating with the storage chamber, the joint having a first passage communicating with the outside through the oil filling port, the hose having a second passage, the first passage, the second passage, and the third passage being in communication for lubricating oil to flow from the oil filling port to the storage chamber.

3. The small internal combustion engine according to claim 2, wherein the hose is made of a transparent material resistant to oil and high temperature.

4. The small internal combustion engine according to claim 1, wherein the hose is made of a fluorosilicone rubber.

5. The small internal combustion engine according to claim 2, wherein the first connecting portion is configured to be socketed to or disengaged from the first end, and the second connecting portion is configured to be socketed to or disengaged from the second end.

6. The small internal combustion engine according to claim 5, wherein the engine body further includes a fastening band on at least one of the first end and the second end, the fastening band being pressable against the hose so that an inner sidewall of the hose is urged inwardly so as to be tightened.

7. The small internal combustion engine according to claim 5, wherein the internal combustion engine body further includes an annular tooth on at least one of an outer sidewall of the first connecting portion and an outer sidewall of the second connecting portion.

8. The small internal combustion engine according to claim 2, wherein the joint assembly interface includes a positioning mechanism on the housing connector, and a positioned mechanism on the joint and matched with the positioning mechanism, the positioning mechanism and the positioned mechanism being configured such that a movement of the joint with respect to the housing connector is axially and radially restricted when the positioned mechanism is mated to the positioning mechanism.

9. The small internal combustion engine according to claim 1, wherein the small internal combustion engine further includes a starter motor that drives the crankshaft via a speed reduction mechanism.

10. The small internal combustion engine according to claim 1, wherein a clamping portion is located on the one of the joint and the housing connector extending circumferentially around the central axis of the joint, the clamping portion located radially inward of and axially between the first mating surface and the second mating surface, and wherein the fourth mating surface is mounted on a hook having an arm extending in a direction parallel to the central axis of the joint, the arm being pivotable radially inwardly to allow the hook to pass the clamping portion when the joint is inserted axially into the housing connector.

11. A garden tool comprising:
a working assembly, a power transmission assembly and a power source assembly, and the power source assembly driving the working assembly to operate via the power transmission assembly;
the power source assembly including a small internal combustion engine having a housing, an internal combustion engine body, a joint, a hose, and a joint assembly interface;
the housing including a housing connector defining a housing oil inlet therethrough;
the joint attached to the housing connector within the housing oil inlet, the joint defining an oil filling port and a first connecting portion spaced from the oil filling port along a central axis of the joint;
the internal combustion engine body arranged in the housing, the internal combustion engine body including a cylinder, a crankcase, a piston arranged in the cylinder, a crankshaft arranged in the crankcase and driving the piston, and an oil pan arranged at a bottom of the crankcase, the oil pan having an oil pan inlet defining a second connecting portion;
the hose having a first end connected to the joint via the first connecting portion and having a second end connected to the oil pan inlet via the second connecting portion to form a fluid passage for lubricating oil to flow from the housing oil inlet to the oil pan; and
the joint assembly interface securing the joint to the housing connector, the joint assembly interface including guiding slots on one of the joint and the housing connector sized for receiving guiding portions on the other of the joint and the housing connector, the guiding slots and the guiding portions extending in a direction parallel to the central axis of the joint for axially aligning the joint and the housing connector, the joint assembly interface further including a first mating surface and a second mating surface on one of the joint and the housing connector and a third mating surface and a fourth mating surface on the other of the joint and the housing connector, the first, second, third and fourth mating surfaces each extending in a direction substantially perpendicular to the central axis of the joint for axially securing the joint and the housing connector.

12. The garden tool according to claim 11, wherein the oil pan includes an oil pan body having the oil pan inlet, a storage chamber for storing lubricating oil, the second connecting portion having a third passage communicating with the storage chamber, the joint assembly having a first passage communicated with the outside through the oil filling port, the hose having a second passage, the first passage, the second passage, and the third passage being in communication for lubricating oil to flow from the oil filling port to the storage chamber.

13. The garden tool according to claim 12, wherein the hose is made of a transparent material resistant to oil and high temperature.

14. The garden tool according to claim 13, wherein the hose is made of a fluorosilicone rubber.

15. The garden tool according to claim 12, wherein the first connecting portion is configured to be socketed to or disengaged from the first end, and the second connecting portion is configured to be socketed to or disengaged from the second end.

16. The garden tool according to claim 15, wherein the engine body further includes a fastening band on at least one of the first end and the second end, the fastening band being pressable against the hose so that an inner sidewall of the hose is urged inwardly so as to be tightened.

17. The garden tool according to claim 15, wherein the internal combustion engine body further includes an annular tooth on at least one of an outer sidewall of the first connecting portion and an outer sidewall of the second connecting portion.

18. The garden tool according to claim 12, wherein the joint assembly interface includes a positioning mechanism on the housing connector, and a positioned mechanism on the joint and matched with the positioning mechanism, the positioning mechanism and the positioned mechanism being configured such that a movement of the joint with respect to the housing connector is axially and radially restricted when the positioned mechanism is mated to the positioning mechanism.

19. The garden tool according to claim 11, wherein the small internal combustion engine further includes a starter motor that drives the crankshaft via a speed reduction mechanism.

20. The garden tool according to claim 11, wherein a clamping portion is located on the one of the joint and the housing connector extending circumferentially around the central axis of the joint, the clamping portion located radially inward of and axially between the first mating surface and the second mating surface, and wherein the fourth mating surface is mounted on a hook having an arm extending in a direction parallel to the central axis of the joint, the arm being pivotable radially inwardly to allow the hook to pass the clamping portion when the joint is inserted axially into the housing connector.

\* \* \* \* \*